3,387,299
LIGHTWEIGHT IFF DETECTION SYSTEM
John H. Gutman, Greenlawn, and Herbert Huebscher, New Hyde Park, N.Y., assignors to Hazeltine Research, Inc., a corporation of Illinois
Filed Nov. 17, 1965, Ser. No. 518,503
17 Claims. (Cl. 343—6.5)

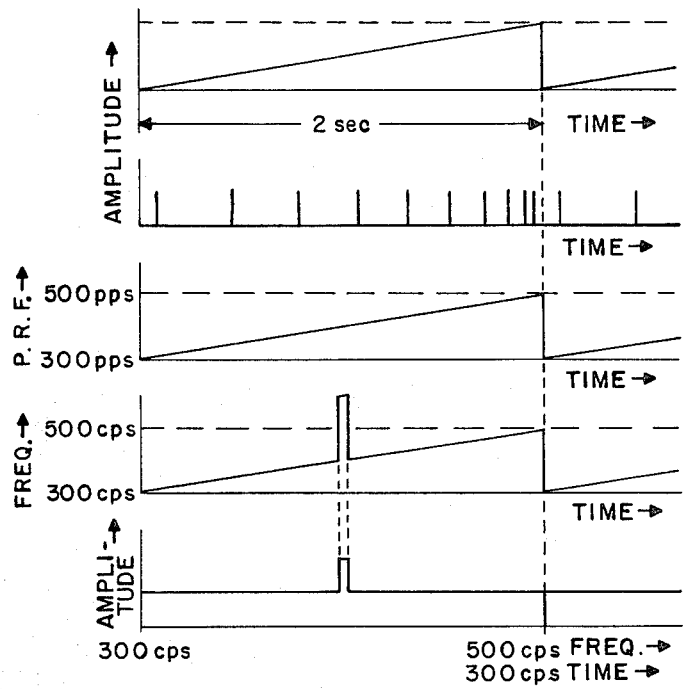
FIG. 2a
FIG. 2b
FIG. 2c
FIG. 2d
FIG. 2e
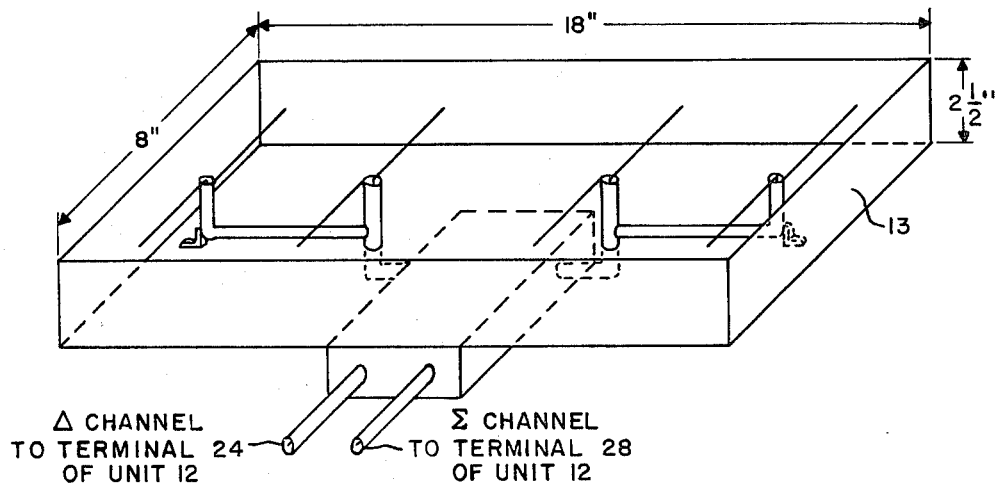
FIG. 4

ABSTRACT OF THE DISCLOSURE

Disclosed is a lightweight IFF interrogator-indicator system capable of portable use by a person to derive an indication of the range and azimuth of a transponding target. An azimuth indication is derived by means of antenna pointing, while a range and identification indication is provided by means of passive aural and/or visual indicator devices, such as a loudspeaker and indicator lamps, respectively. Other embodiments are covered.

---

The present invention relates, in general, to identification systems commonly referred to as IFF (identification friend or foe) systems. More particularly, the invention is concerned with a lightweight IFF detection system for portable use, and specifically, with such a system which additionally provides an indication of the range to a transponding target.

Prior art IFF detection systems are not suited for portable use due to their excessive size, weight, and power requirements. This results from their use of large rotating antennas and complex display indicators employing active indicator devices, such as cathode-ray tubes, which require weight and space consuming power supplies, scanning apparatus, and drive circuits. Yet, portability in IFF systems is becoming more and more a significant factor. For example, consider a combat situation where aircraft operate over an area populated by highly dispersed ground forces armed with portable ground-to-air missiles operable by one or two men either on foot, or from a small vehicle such as a jeep. In a situation such as this, immediate identification of the aircraft by the mobile ground forces is a necessity if they are to be able to both effectively defend themselves and avoid firing at friendly aircraft. Thus, there is need for a lightweight IFF detection system as easily transportable as the mobile weapons systems which have become common elements in the arsenal of today's ground forces.

It is therefore an object of the present invention to provide a lightweight IFF detection system for portable use which may also provide an indication of the range to a transponding target, or may include a simplified novel indicator unit employing passive indicator devices, or both of these.

As will become clear hereinafter, the present invention achieves portability in an IFF system by utilizing a combination of weight and space-saving features including passive indicator devices for presenting the IFF output information to the system operator in a simplified, easily understood format, and side-lobe-suppression beam-sharpening which permits use of a small manually trained and supported antenna.

As used herein, the term "active indicator device" means an indicator device requiring a source of power other than that supplied or controlled by the actuating signal (i.e.: a cathode-ray tube requires a deflection power source in addition to the actuating video signal). Conversely, as used herein, the term "passive indicator device" means an indicator device requiring no source of power other than that supplied or controlled by the actuating signal, (i.e.: a loudspeaker or indicator lamp).

For a better understanding of the present invention together with other and further objects thereof, reference is had to the following description taken in connection with the accompanying drawings, and its scope will be pointed out in the appended claims.

Referring to the drawings:

FIG. 1 of the drawings is a block diagram of an IFF detection system which embodies the present invention in one form;

FIGS. 2a–2e are signal diagrams useful in describing the operation of the embodiment of FIG. 1;

FIG. 4 is an illustration of a suitable antenna design for use in the system of FIG. 1, and having the characteristic shown in FIG. 2;

Figures 1, 3:
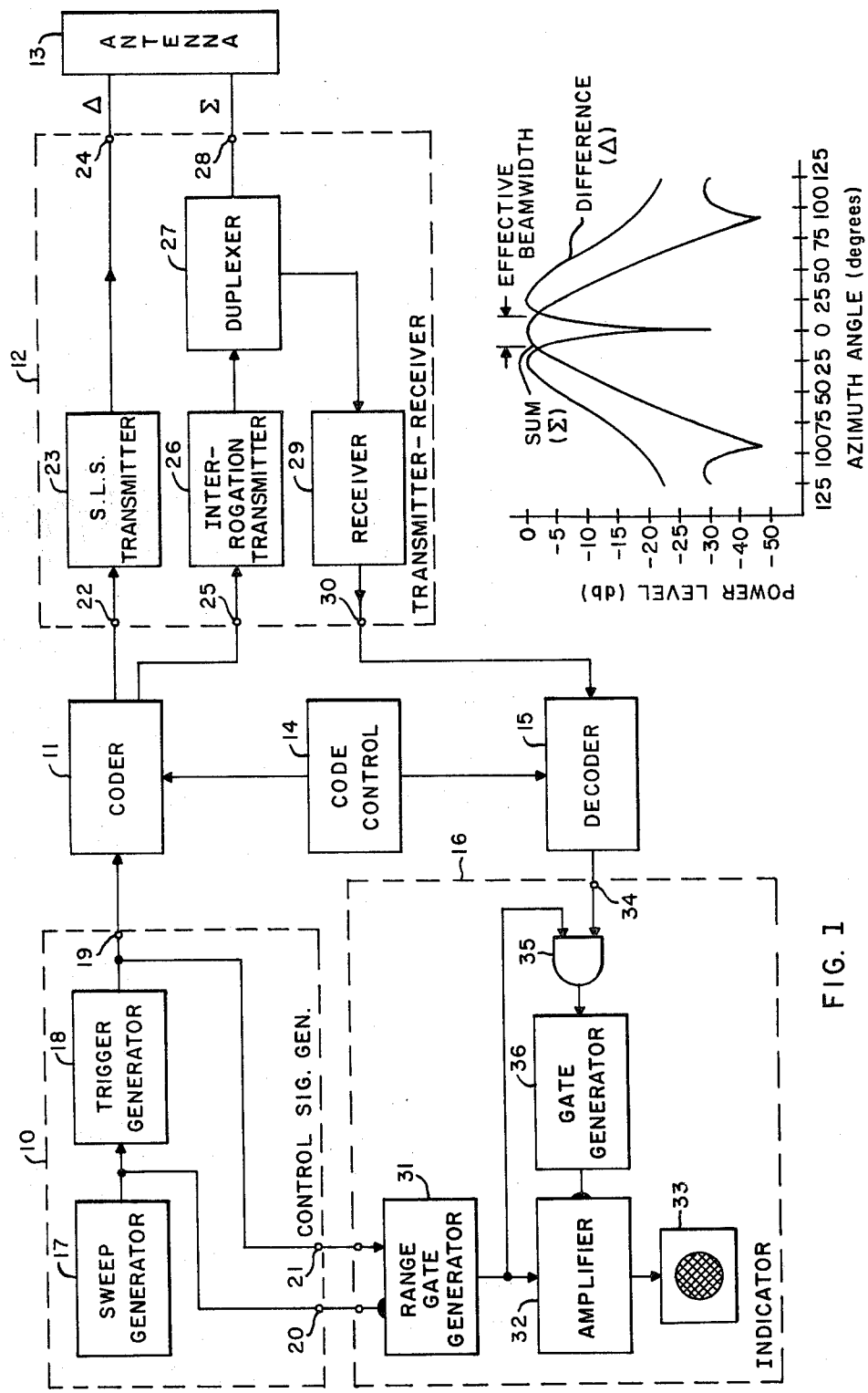
FIG. 3 is a diagram illustrating suitable characteristics for the antenna shown in block form in FIG. 1.
Figure 5:
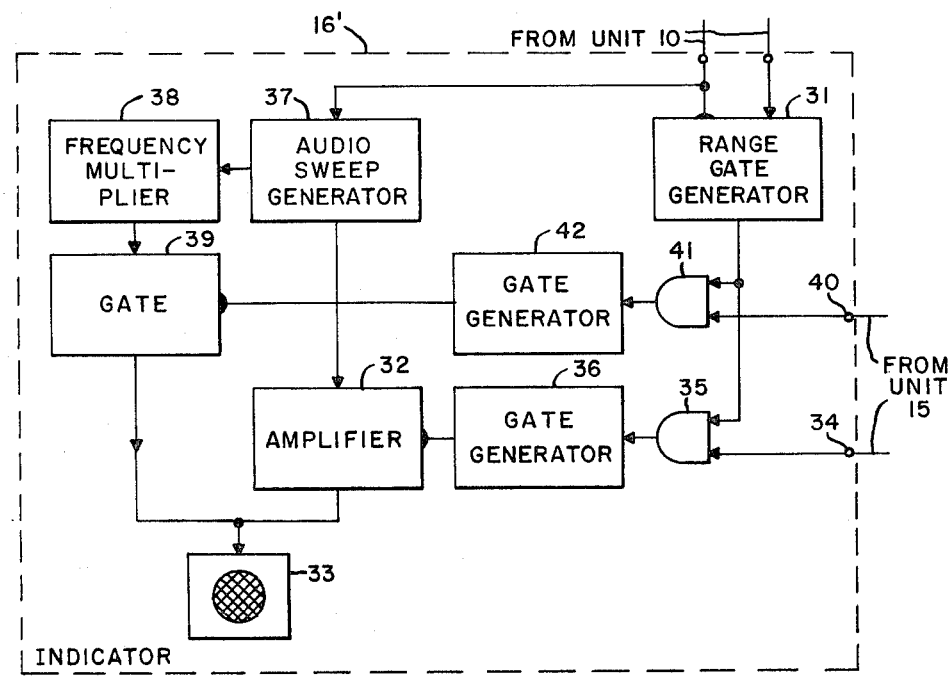
Figure 6:
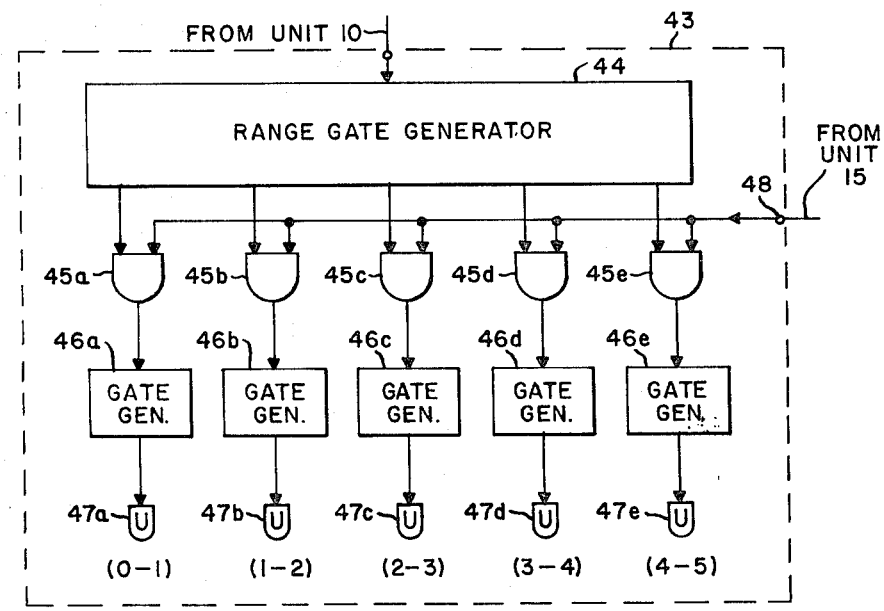

FIG. 5 is a block diagram, partly schematic, of another form of indicator which may be used in place of the unit 16 of FIG. 1, and FIG. 6 is a block diagram, partly schematic, of yet another form of indicator which may be used either in place of, or in addition to, the units 16 and 16' of FIGS. 1 and 5, respectively.

Description of the system of FIG. 1

In FIG. 1 there is shown a typical embodiment of an IFF detection system for portable use, constructed in accordance with the present invention. Considering the overall system of FIG. 1, means for transmitting a coded interrogation signal toward a target and for receiving a coded reply signal therefrom, consists of the units 10–15 inclusive, each of which will be described in greater detail hereinafter. Also in FIG. 1, means, including a passive indicator device, for developing an indication in response to a correctly coded reply signal is shown as the unit 16.

Considering now each of the aforementioned units of FIG. 1 in detail and their interrelationship, unit 10 is a control signal generator unit for developing timing and control signals necessary to coordinate system operation. As such, in the present embodiment, unit 10 includes a sweep generator 17 for generating a sawtooth output waveform such as that shown in FIG. 2a for example. Generator 17 may be of conventional design, and is arranged to include a control switch for initiating system operation. The output of generator 17 is jointly coupled to the input of a trigger generator 18, and to a control input of range gate generator 31 in unit 16 via output terminal 20 of unit 10.

Trigger generator 18 develops an output signal consisting of a series of trigger pulses, whose repetition rate, or PRF, is controlled by the sawtooth waveform from sweep generator 17. For example, trigger generator 18, may be a conventional astable multivibrator whose PRF varies from 300 p.p.s. to 500 p.p.s. in response to each input sawtooth from sweep generator 17, as shown in FIGS. 2b and 2c. The output of trigger generator 18 is jointly coupled to an input of coder unit 11, via output terminal 19, and to an input of range gate generator 31 in unit 16, via output terminal 21 of unit 10.

Coder unit 11 may be of conventional design and construction, and is arranged, in the present embodiment, for developing separate IFF interrogation and side-lobe-suppression (SLS) control signals in response to each trigger pulse supplied from unit 10. Coder 11 is additionally responsive to a control signal from code control unit 14 which serves to determine the particular interrogation code signal developed at the interrogation signal output of coder 11. Since, IFF signal coders, decoders, and code control units are generally well-known in the art, these units will not be described in detail herein.

In the present example, it is assumed that coder 11 produces an interrogation signal consisting of only a pulse pair, and, in addition, produces an SLS signal consisting of a single SLS control pulse. For this purpose, coder 11 may consist of a simple tapped delay line, wherein the trigger pulses are supplied to the input of such line and the IFF interrogation signal pulse pair, and SLS control pulse, are developed at suitable taps along the line. In this case, code control unit 14 may serve to select appropriate taps on the delay line for establishing the desired spacing between pulses in the interrogation signal pulse pair. Those skilled in the art will immediately recognize that other, more sophisticated, coder units may be used in place of the simple unit just described, to provide a full range of IFF interrogation code signals.

Transmitter-receiver 12 may be of conventional design and construction and incorporates the transmitter SLS beam-sharpening feature well-known in the art. As an obvious alternative, receiver beam-sharpening may be used where desired. In the particular embodiment of FIG. 1, the SLS control pulses from coder 11 are coupled to input terminal 22 of unit 12, where they are, in turn, fed to a suitable SLS transmitter 23, the output of which is coupled to output terminal 24. In like manner, the interrogation signal from coder 11 is coupled to input terminal 25 of unit 12, where it is fed, in turn, to a suitable interrogation transmitter 26, the output of which is coupled to terminal 28 of unit 12 through a suitable duplexer 27.

The receiving channel of unit 12 consists of a suitable receiver 29, whose input is coupled to terminal 28 through the aforementioned duplexer 27. Receiver 29 may be of conventional design and construction, and preferably includes the gain-time-control (GTC) feature well-known to those skilled in the art. The output of receiver 29, in turn, is coupled to an input of the decoder unit 15, by output terminal 30 of unit 12.

Antenna 13 is arranged to provide the necessary SUM ($\Sigma$) and DIFFERENCE ($\Delta$) response characteristics of implement the SLS beam-sharpening feature of the system in FIG. 1. To this end, the DIFFERENCE channel of antenna 13 is coupled to the SLS output terminal 24 of transmitter-receiver unit 12, while the SUM channel is coupled to terminal 28. Since the apparatus in FIG. 1 is specifically designed for portable use, antenna 13 is preferably of light-weight design and construction so that it may be manually trained and supported, without the need for additional supporting elements, such as a tripod, or other ground support. A suitable design for antenna 13 is shown in FIG. 4 wherein antenna 13 consists of two pair of dipole elements arranged in a linear array with a metallized reflector, and may typically have the dimensions of 18" x 8" x 2½". The two pairs of dipole elements of antenna 13 are combined in a conventional manner to provide the SUM and DIFFERENCE channels necessary to implement SLS beam sharpening. Suitable ($\Sigma$) and ($\Delta$) response characteristics for antenna 13 are shown in FIG. 3. Using commonly known light-weight construction techniques, such an antenna may be constructed so that its over-all weight typically is less than two pounds.

Decoder unit 15 may be of conventional design and construction, and is provided for decoding the received coded reply signal presented to its input from output terminal 30 of transmitter-receiver unit 12. In the present embodiment, it is assumed that decoder unit 15 is arranged to decode the reply signal bracket pulses only. However, those skilled in the art will recognize that a more sophisticated decoder may be provided for decoding the intermediate code pulses of a coded reply signal in addition to the bracket pulses. In the latter case, decoder 15 would be provided with two separate outputs. A signal at one output would indicate reception of a coded reply signal having proper bracket pulses, while a signal at the second output would indicate reception of a coded reply signal having proper intermediate code pulses. In this way, decoder 15 could distinguish between a first target, transponding a properly coded reply signal, and a second target, transponding a coded reply signal having proper bracket pulses, but improper intermediate code pulses, for example. However, as mentioned previously, in the particular embodiment of FIG. 1, it will be assumed that decoder 15 decodes only the bracket pulses of the received coded reply signal, and presents a single pulse at its output if the bracket pulses are found to have the proper spacing. Here again, code control unit 14 functions only to adjust bracket pulse decoding, but in more sophisticated embodiments would serve to control intermediate code pulse decoding, such that a different code could be selected for use each day, for example.

The final unit in the system of FIG. 1 is indicator unit 16. In the present embodiment, unit 16 includes a passive aural indicator device, which in this case is a loudspeaker 33, for developing an indication in response to an input signal from decoder 15, indicating receipt of a correctly coded reply signal, in this case, one having proper bracket pulses. More particularly, unit 16 is arranged for developing an audible reference signal from the sawtooth and trigger signals supplied by control signal generator unit 10, and for producing a sudden perceptible change in the amplitude characteristic of the audible reference signal in response to the aforementioned input signal from decoder 15, indicating receipt of a correctly coded reply signal.

In the embodiment of FIG. 1, indicator unit 16 includes a range gate generator 31, amplifier 32, and loudspeaker 33, coupled in cascade in the order named. Range gate generator 31 is fed sweep signals and trigger pulses via connections to output terminals 20 and 21 of control signal generator unit 10. The output of range gate generator 31 is also coupled to an input of AND circuit 35, which is included in the indicator unit 16. AND circuit 35 has a second input fed from the output of decoder 15, while the output and AND circuit 35 is coupled to a control terminal of amplifier 33 via a gate generator 36, for controlling the gain of that amplifier.

While it is not shown in FIG. 1, a power supply must naturally be included in the IFF system; however, suitable light-weight power supplies are well-known to those skilled in the art. For example, a 12-volt battery pack consisting of silver-zinc cells, voltage regulator, and D-C to D-C converter could supply the necessary operating voltages for the system of FIG. 1.

Since the present invention is intended for portable use, the individual units of the embodiment of FIG. 1 are preferably constructed of such light-weight structural materials as aluminum, Fiberglas and plastics, for example, while the electronic circuitry is designed to occupy a minimum of space by taking advantage of the many microminiaturization techniques available. Due to the simplicity of the embodiment of FIG. 1, over-all system weight can be made to be less than ten pounds for a typical system.

*Operation of the system of FIG. 1*

In describing the operation of the system of FIG. 1, one typical cycle of system operation will be considered. Operation is initiated by activating sweep generator 17 by means of a manually controlled switch, for example, thereby causing a ramp of sawtooth signal, such as that shown in the signal diagram of FIG. 2a, to be applied simultaneously to the input of trigger generator 18 and to the control input of range gate generator 31. This ramp signal causes trigger generator 18 to produce a series of one microsecond trigger pulses at an increasing PRF as shown in simplified form in the signal diagram of FIG. 2b. The initial PRF may be 300 p.p.s. and the final PRF, 500 p.p.s., as shown in FIG. 2c for example, however, these values have been selected for purposes of illustration only.

The series of one microsecond trigger pulses produced by trigger generator 18 are jointly applied to the input of coder 11 and to the input of range gate generator 31.

Considering now coder 11, as each trigger pulse is supplied to its input, coder 11 responds by producing a coded interrogation signal and an SLS control pulse. In the present example, the interrogation signal consists of a pair of one microsecond pulses whose spacing is eight microseconds, while the one microsecond SLS control pulse is located between the interrogation pulses and is spaced two microseconds from the first interrogation pulse in the pulse pair. The interrogation signal pulse pair appears at one output of coder 11 and is supplied to the interrogation signal transmitter 26, while the SLS control pulse appears at a second output of coder 11 and is supplied to the separate SLS signal transmitter 23 in unit 12. After modulation on an RF carrier, and amplification, the interrogation signal is transmitted via the SUM ($\Sigma$) channel of antenna 13, while the SLS control pulse is transmitted by the DIFFERENCE ($\Delta$) channel in order to achieve transmitter SLS beam-sharpening in the well-known manner.

In summary, for each ramp or sawtooth generated by sweep generator 17, trigger generator 18 responds with a series of one microsecond trigger pulses increasing in PRF from 300 to 500 p.p.s. Each trigger pulse, in turn, causes a coded interrogation signal, consisting of a pulse pair, and an SLS control pulse to be transmitted via the ($\Sigma$) and ($\Delta$) channels respectively of antenna 13. Assuming that a target equipped with the proper transponder is present within range of the effective main beam of antenna 13, which maximum range is assumed to be five miles in the present system, it will be interrogated and will respond with a coded reply signal for each interrogation. The reply signals are received by the combination of the SUM ($\Sigma$) channel of antenna 13 and receiver 29, decoded by decoder 15, and a single output pulse presented at the output of decoder 15 for each correctly coded reply signal received.

Turning now to the operation of indicator unit 16, range gate generator 31 produces a series of range gate pulses, each of three microseconds' duration, for example, at an increasing PRF, and increasing range sweep in response to the trigger pulses, and sawtooth signal applied to its inputs from the control signal generator unit 10. The increasing PRF of the range gate pulses corresponds to that of the trigger pulses, namely 300 to 500 p.p.s. In other words, range gate generator 31 produces a series of three microsecond output pulses where each output pulse results from a corresponding input trigger pulse, but is delayed with respect to the corresponding trigger pulse by an amount increasing from 60 microseconds to 140 microseconds, for example, in order to provide the necessary range gating effect over the system's effective range of zero to five miles.

The audio frequency portion of the range gate pulse frequency spectrum is amplified by amplifier 32 and supplied to loudspeaker 33 to produce an audible reference signal of 300 to 500 c.p.s. ascending frequency. AND circuit 35 detects coincidence between a range gate pulse and a pulse from decoder 15, indicating receipt of a properly coded reply signal, which triggers a one millisecond gate signal from gate generator 36. The gate signal increases the gain of amplifier 32 when coincidence exists. Thus, at the time of coincidence, the ascending audio reference signal heard from loudspeaker 33 will be increased in volume, as shown in the illustrative signal diagram of FIG. 2e, where it is assumed that the reply signal occurs approximately midway in the ascending tone. In order that this increase in volume be heard as a short tone instead of a click, a high percentage of correctly coded replies are required to be received at the same range interval in response to a group of successive interrogations. The range gate width, the range sweep rate, and the interrogation rate are adjusted to examine each range interval for a period corresponding to from fifteen to thirty interrogations. Receipt of sixty percent or more of the possible number of correctly coded replies with any range interval examined will provide an easily perceived tone of increased volume from loudspeaker 33. In this manner a sudden perceptible change in the amplitude characteristic of the audio reference signal is produced in response to the input signal from decoder 15, indicating the receipt of a correctly coded reply signal from a transponding target.

In accordance with the present invention a range indication is also provided by the ascending audio reference signal. The duration of the audio sweep is representative of the range under surveillance; that is, the beginning of the sweep represents minimum response range, while the end of the sweep, maximum response range of the system. In effect, to an operator of the system, the ascending audible reference signal creates the impression of a range gate sweeping out over the area under surveillance. Thus, a range estimate may be had by simply noting at what point in the audio sweep a target indication is heard. For example, in the signal diagram of FIG. 2e, the target indication occurs approximately midway in the ascending audible reference signal, thus indicating a transponding target at a range of approximately half of the maximum range of the system in FIG. 1.

Additionally, the system is also capable of providing an approximate indication of the radial velocity of the target by having the system operator note the change in frequency between two subsequent indications for the same target. If the second indication occurs at a higher frequency than the first, it reveals that the target has a positive radial velocity component; that is, that the target is moving away from the system. Likewise, the converse is also true. An approximate indication of the magnitude of the radial velocity component may be had by simply noting the amount of frequency increase, or decrease, between subsequent target indications. The greater the frequency increase, the greater the radial velocity, and vice versa.

In the embodiment of FIG. 1, since the trigger pulses from trigger generator 18 serve two purposes (i.e., determine interrogation PRF and determine audible reference signal frequency) a compromise was made in selecting the PRF to be 300 to 500 p.p.s. In some cases this PRF will be too high for the most efficient over-all IFF system operation. In this instance, the trigger pulses may be counted down by 2; 1, for example, before being applied to coder 11. This serves to cut the interrogation PRF in half; that is, to 150–250 p.p.s. The resulting 150–250 c.p.s. audio frequency signal appearing at the output of amplifier 32 may then be multiplied by a factor of 2 or 4, for example, before being applied to loudspeaker 33 to place the audible reference signal in a more suitable portion of the audio frequency range.

Alternatively, a constant PRF can be used for interrogation, in which case indicator unit 16 may include a separate audio sweep generator, such as is shown in the embodiment of FIG. 5. In this case, the interrogation PRF may typically be 50 p.p.s., while the audio sweep generator covers the range of 300–500 c.p.s. Since these alterations to the embodiment of FIG. 1 are merely a matter of design, those skilled in the art will be readily able to adapt the basic invention to fulfill other desired operating conditions as the case may arise.

*Description and operation of the indicator unit of FIG. 5*

In FIG. 5 of the drawings, there is shown another embodiment of the indicator unit 16' suitable for use in place of the indicator unit 16 in the system of FIG. 1. In the embodiment of FIG. 5 it is assumed that decoder 15 has been adapted, as described hereinbefore, to produce two output signals; one indicating receipt of a reply signal having correctly coded bracket pulses, and another indicating that the intermediate code pulses of the reply signal are correct. In other words, in the indicator unit 16' of FIG. 5, if a reply having correct bracket pulses plus correct code pulses is received from a target, two signals will be applied simultaneously to input terminals 34 and 40. However, if a reply having correct bracket pulses plus incorrect code pulses is received from a target, a signal will be applied only to input terminal 34.

Indicator unit 16' includes a range gate generator 31 which is the same as that in unit 16 of FIG. 1, in that it generates a three microsecond sweeping range gate in response to the sweep signal and trigger pulses applied to its inputs. The output of range gate generator 31 is jointly coupled to an input of each of the two AND circuits 35 and 41. The other input of AND circuit 35 is coupled to input terminal 34, while the other input of AND circuit 41 is coupled to input terminal 40.

Also included in unit 16' is a separate audio sweep generator 37, which is responsive to the sweep signal coupled to its input, for generating an output audio frequency signal which sweeps over a frequency range of 300 to 500 c.p.s., for example. The swept audio signal from generator 37 is coupled jointly to an input of frequency multiplier 38 and amplifier 32. The output of amplifier 32 is, in turn, coupled to the input of loudspeaker 33, while the output of frequency multiplier 38 is coupled through gate circuit 39 to the same input of loudspeaker 33. Gate circuit 39 is normal and closed, and is controlled by the output of AND circuit 41, via gate generator 42. In addition, AND circuit 35 has its output coupled to the control input of amplifier 32 via gate generator 36, for controlling the gain of that amplifier.

In operation, unit 16' produces an audible reference signal of ascending frequency for each cycle of system operation, by means of audio sweep generator 37, amplifier 32 and loudspeaker 33. Upon receipt of a correctly coded reply signal from a target aircraft, signals are simultaneously applied to input terminals 34 and 40, activating both AND circuits when gated by a range gate signal from generator 31. This results both in the opening of gate 39 and a sudden increase in gain of amplifier 32, creating a sudden perceptible increase in both the amplitude and frequency characteristics of the audible reference signal heard from loudspeaker 33 as shown in the signal diagrams of FIGS. 2d and 2e. On the other hand, when a reply signal having proper bracket pulses, but improper intermediate code pulses is received from a target aircraft, a signal is applied only to the input terminal 40, activating AND circuit 41, which in turn causes gate generator 42 to open gate 39, thus supplying a signal to speaker 33 whose frequency is greater than that of the instantaneous frequency being supplied to speaker 33 from audio generator 37 via amplifier 32. The result is a sudden perceptible increase in frequency of the audible reference signal heard from loudspeaker 33 as shown in the signal diagram of FIG. 2d. Thus, a reply from a properly transponding aircraft produces a sudden increase in both the amplitude and frequency of the audible reference signal, while a reply from an improperly transponding aircraft produces only a sudden increase in frequency of the audible reference signal; two clearly discernible indications for the operator of the system. In addition, range indication is provided for either type aircraft in the manner previously described. Thus, the embodiment of FIG. 5 is not only capable of producing distinguishable, audible indications of targets transponding either correct or incorrect reply signals but also, at the same time, provides approximate indications of range for both types of targets.

Those skilled in the art will recognize that frequency multiplier 39 in the embodiment of FIG. 5 may be replaced with a frequency divider, to produce a sudden perceptible decrease in the frequency characteristic of the audible reference signal heard from loudspeaker 33 in response to an incorrect reply from a transponding target.

Likewise, the indications provided for correctly coded and incorrectly coded reply signals may be interchanged by merely switching the input signals fed to input terminals 34 and 40, for example. That is, as an alternative, in the embodiment of FIG. 5 a signal from decoder 15 indicating proper bracket pulses could be supplied to input terminal 34, while a signal indicating proper intermediate code pulses could be supplied to input terminal 40. In this case, a correctly coded reply signal would be indicated by a simultaneous increase in both the frequency and amplitude of the audible reference signal, while an incorrectly coded reply signal would be indicated by an increase in only the amplitude of the reference signal.

*Description and operation of the indicator unit 43 of FIG. 6*

In FIG. 6 of the drawings there is shown another indicator unit 43 which may be used either in place of, or in conjunction with, the previously described indicator units 16 and 16'. The reason for this, is that unit 43 is a visual indicator unit, and as such may either replace or supplement the oral indication provided by units 16 and 16'.

In essence, unit 43 is a means for developing a visual indication in response to a correctly coded reply signal, and as such, includes passive visual indicator devices, which in the present embodiment are the indicator lamps 47a–47e, inclusive.

Unit 43 includes a range gate generator 44, controlled by the trigger pulses supplied to its input from trigger generator 18 of the control signal generator unit 10 of FIG. 1, for example. Range gate generator 44 produces five consecutive range gate signals, supplying each, in sequence, to an input of a corresponding one of the five AND circuits 45a–45e, inclusive. The other input of each of the five AND circuits 45a–45e is connected to input terminal 48, which is fed from the output of decoder unit 15 of FIG. 1, for example.

Also included in unit 43 are a series of five gate generators 46a–46e, each of which is triggered by the output of a corresponding one of the five AND circuits 45a–45e. Gate generators 46a–46e function as lamp drivers, and are adjusted to provide an amount of energy to the lamps which is sufficient to cause observable illumination only when a high percentage of correctly coded replies is received in any given range interval in response to a group of ten to twenty successive interrogations, for example. In this manner, indicator unit 43 integrates the information appearing in the output signal from decoder 15 so as not to develop an erroneous target indication from impulse noise, or spurious random reply signals such as those elicited from a transponding target by other interrogators which may be present within the operating area.

During each interrogation cycle, range gate generator 44 produces five consecutive range gate signals, each of 12.3 microseconds duration, for example. Each range gate signal is applied to a corresponding one of the AND circuits 45a–45e. Hence, if a target transponding correctly coded reply signals exists within any one of the five range intervals, a pulse for each correctly coded reply signal will be received from decoder 15 via input terminal 48, which will cause coincidence at one of the AND circuits. For example, if a target transponding correctly coded reply signals exists in the range interval of (1–2) miles, coincidence at AND circuit 45b will occur for each correctly coded reply signal received, triggering gate generator 46b each time. Repeated replies to successive interrogations will cause observable illumination from lamp 47b, providing a target indication.

In this manner, indicator unit 43 of FIG. 5 uses passive indicator devices to provide a direct visual indication of the presence of a properly transponding target and of the range to that target. Where desired, unit 43 may be modified to include a second bank of indicator lamps controlled by a corresponding second set of AND circuits, but fed from the same range gate generator 44, to provide an indication of the presence of, and approximate range to, targets transponding incorrectly coded reply signals. In this case the second set of AND circuits would be fed from an additional output of decoder unit 15 indicating receipt of a reply signal having correctly coded bracket pulses, but incorrectly coded intermediate code pulses for example, as described previously in relation of the indicator unit 16' of FIG. 2.

While there has been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A lightweight IFF interrogator-indicator system capable of portable use by a person to derive an indication of the range and azimuth of a target, comprising:

control signal generating means for generating at least a first control signal having a characteristic determinative of the duration of one cycle of system operation;

transmitting and receiving means, coupled to said control signal generating means and including a compact lightweight antenna having a directional characteristic and capable of being manually trained toward a target to be interrogated thereby to provide an indication of the approximate azimuth of said target, for generating and transmitting a plurality of coded interrogation signals toward a target during each cycle of system operation, for receiving coded reply signals from a transponding target, and for developing output signals in response to each received coded reply signal;

and indicator means, responsive to said output signals and including both a passive aural indicator device and a passive visual indicator device, for developing an audible reference signal from said aural device during each cycle of system operation, and for producing a change in a characteristic of said audible reference signal in response to said output signals, thereby to provide an audible indication of the receipt of reply signals from a transponding target, identifying said target, and of the approximate range of said target from the system, and for producing a change in the operating state of said visual device in response to said output signals, thereby to additionally provide a visual indication of the receipt of reply signals from said transponding target and of the approximate range of said target from the system.

2. A lightweight IFF interrogator-indicator system in accordance with claim 1 wherein said transmitting and receiving means develops a first output signal in response to each received correctly coded reply signal, and wherein said indicator means produces a change in a first characteristic of said audible reference signal in response to said first output signals, thereby to provide an audible indication of the receipt of correctly coded reply signals from a transponding target, identifying said target, and of the approximate range of said target from the system, and wherein said indicator means also produces a change in the operating state of said visual indicator device in response to said first output signals, thereby to additionally provide a visual indication of the receipt of correctly coded reply signals from said transponding target and of the approximate range of said target from the system.

3. A lightweight IFF interrogator-indicator system in accordance with claim 2, wherein said transmitting and receiving means additionally develops a second output signal in response to each received incorrectly coded reply signal, and wherein said indicator means produces a change in a second characteristic of said audible reference signal in response to said second output signals, thereby to provide an audible indication to the receipt of incorrectly coded reply signals from a transponding target, identifying said target, and of the approximate range of said target from the system, and wherein said indicator means includes a second passive visual indicator device, and wherein said indicator means produces a change in the operating state of said second visual device in response to said second output signals, thereby to additionally provide a visual indication of the receipt of incorrectly coded reply signals from a transponding target and of the approximate range of said target from the system.

4. A lightweight IFF interrogator-indicator system in accordance with claim 2 wherein said system includes range gate generating means, coupled to said control signal generating means, for generating a plurality of range gate signals during each cycle of system operation, each range gate signal representing a predetermined range interval from said system, and wherein said indicator means is jointly responsive to said first output signals and to said range gate signals, for detecting coincidence between said first output signals and said range gate signals for producing said change in the first characteristic of said audible reference signal in response to at least same of said detected coincidences, thereby to provide said audible indication, and wherein said indicator means produces a change in the operating state of said visual device in response to at least some of said detected coincidences, thereby to provide said visual indication.

5. A lightweight IFF interrogator-indicator system in accordance with claim 2, wherein said passive visual indicator device consists of a set of indicator lamps, each lamp being representative of a predetermined range interval from said system, and wherein a selected one of the lamps in said set is activated in response to said first output signals, thereby to provide said visual indication.

6. A lightweight IFF interrogator-indicator system capable of portable use by a person to derive an indication of the range and azimuth of a target, comprising:

control signal generating means for generating at least a first control signal having a characteristic determinative of the duration of one cycle of system operation;

transmitting and receiving means, coupled to said control signal generating means and responsive to said first control signal and including a compact lightweight antenna having a directional characteristic and capable of being manually trained toward a target to be interrogated thereby to provide an indication of the approximate azimuth of said target, for generating and transmitting a plurality of coded interrogation signals toward a target during each cycle of system operation, for receiving coded reply signals from a transponding target, and for developing a first output signal in response to each received correctly coded reply signal and a second output signal in response to each received incorrectly coded reply signal;

range gate generating means, coupled to said control signal generating means, for generating first and second series of range gate signals during each cycle of system operation, each range gate signal in a series being representative of a predetermined range interval from said system;

first indicator means responsive to said output signals and to range gate signals of said first series and including a passive aural indicator device, for developing an audible reference signal from said aural device during each cycle of system operation, for detecting coincidence between said first output signals and range gate signals of said first series and for producing a change in a first characteristic of said audible reference signal in response to each such detected coincidence, thereby to provide an audible indication of the receipt of correctly coded reply signals from a transponding target, identifying said target, and of the approximate range of said target from the system, and for detecting coincidence between said second output signals and range gate signals of said first series and for producing a change in a second characteristic of said audible reference signal in response to each such detected coincidence, thereby to provide an audible indication of the receipt of incorrectly coded reply signals from a transponding target, identifying said target, and of the approximate range of said target from the system;

and second indicator means, responsive to said output signals and to range gate signals of said second series and including first and second passive visual indicator devices, for detecting coincidence between said first output signals and range gate signals of said second series and for producing a change in the operating state of said first visual device in response to each such detected coincidence, thereby to additionally provide a visual indication of the receipt of correctly coded reply signals from said transponding target and of the approximate range of said target from the system, and for detecting coincidence between said second output signals and range gate signals of said second series and for producing a change in the operating state of said second visual device in response to each such detected coincidence, thereby to additionally provide a visual indication of the receipt of incorrectly coded reply signals from said transponding target and of the approximate range of said target from the system.

7. A lightweight IFF interrogator-indicator system capable of portable use by a person to derive an indication of the range and azimuth of a target, comprising:

control signal generating means for generating at least a first control signal having a characteristic determinative of the duration of one cycle of system operation;

transmitting and receiving means, coupled to said control signal generating means and including a compact lightweight antenna having a directional characteristic and capable of being manually trained toward a target to be interrogated thereby to provide an indication of the approximate azimuth of said target, for generating and transmitting a plurality of coded interrogation signals toward a target during each cycle of system operation, for receiving coded reply signals from a transponding target, and for developing an output signal in response to each received coded reply signal;

and indicator means, responsive to said output signals and including a passive aural indicator device, for developing an audible reference signal from said aural device during each cycle of system operation, and for producing a change in a characteristic of said audible reference signal in response to said output signals, thereby to provide an audible indication of the receipt of reply signals from a transponding target, identifying said target, and of the approximate range of said target from the system.

8. A lightweight IFF interrogator-indicator system in accordance with claim 7 wherein said transmitting and receiving means develops a first output signal in response to each received correctly coded reply signal, and wherein said indicator means produces a change in a first characteristic of said audible reference signal in response to said first output signals, thereby to provide an audible indication of the receipt of correctly coded reply signals from a transponding target, identifying said target, and of the approximate range of said target from the system.

9. A lightweight IFF interrogator-indicator system in accordance with claim 8 wherein said transmitting and receiving means additionally develops a second output signal in response to each received incorrectly coded reply signal, and wherein said indicator means produces a change in a second characteristic of said audible reference signal in response to said second output signals, thereby to provide an audible indication of the receipt of incorrectly coded reply signals from a transponding target, identifying said target, and of the approximate range of said target from the system.

10. A lightweight IFF interrogator-indicator system in accordance with claim 8 wherein said system includes range gate generating means, coupled to said control signal generating means, for generating a plurality of range gate signals during each cycle of system operation, each range gate signal representing a predetermined range interval from said system; and wherein said indicator means is jointly responsive to said first output signals and to said range gate signals, for detecting coincidence between said first output signals and said range gate signals for producing said change in the first characteristic of said audible reference signal in response to each of such detected coincidences, thereby to provide said audible indication of the receipt of correctly coded reply signals from a transponding target and of the approximate range of said target from the system.

11. A lightweight IFF interrogator-indicator system in accordance with claim 8, wherein said control signal generating means generates a first control signal consisting of a sequence of pulses wherein the pulse repetition rate varies between a first rate at the beginning of the sequence and a second rate at the end of the sequence, the duration of the over-all sequence determining the duration of one cycle of system operation, and wherein said transmitting and receiving means generates and transmits a plurality of coded interrogation signals toward a target during each cycle of system operation at a repetition rate varying in accordance with that of the pulses of the first control signal and wherein the range gate generating means generates a plurality of range gate signals during each cycle of system operation at a repetition rate varying in accordance with that of the pulses of said first control signal.

12. A lightweight IFF interrogator-indicator system capable of portable use by a person to derive an indication of the range and azimuth of a target, comprising:

control signal generating means for generating at least a first control signal having a characteristic determinative of the duration of one cycle of system operation;

transmitting and receiving means, coupled to said control signal generating means and including a compact light-weight antenna having a directional characteristic and capable of being manually trained toward a target to be interrogated thereby to provide an indication of the approximate aximuth of said target, for generating and transmitting a plurality of coded interrogation signals toward a target during each cycle of system operation, for receiving coded reply signals from a transponding target, and for developing a first output signal in response to each received correctly coded reply signal and a second output signal in response to each received incorrectly coded reply signal;

range gate generating means, coupled to said control signal generating means, for generating a plurality of range gate signals during each cycle of system operation, each range gate signal representing a predetermined range interval from said system;

and indicator means responsive to said output signals and to said range gate signals and including a passive aural indicator device, for developing an audible reference signal from said device during each cycle of system operation, for detecting coincidence between said first output signals and said range gate signals and for producing a change in a first characteristic of said reference signal in response to
each such detected coincidence, thereby to provide
an audible indication of the receipt of correctly
coded reply signals from a transponding target, identifying said target, and of the approximate range of
said target from the system, and for detecting coincidence between said second output signals and
said range gate signals and for producing a change
in a second characteristic of said reference signal in
response to each such detected coincidence, thereby
to provide an audible indication of the receipt of
incorrectly coded reply signals from a transponding
target, identifying said target, and of the approximate range of said target from the system.

13. A lightweight IFF interrogator-indicator system
capable of portable use by a person to derive an indication of the range and azimuth of a target, comprising:
  control signal generating means for generating at least
    a first control signal having a characteristic determinative of the duration of one cycle of system
    operation;
  transmitting and receiving means coupled to said control signal generating means including a compact
    light-weight antenna having a directional characteristic and capable of being supported by a single
    person and manually trained toward a target to be
    interrogated whereby the direction in which the antenna is manually trained provides an indication of
    the approximate azimuth of said target, for generating and transmitting a plurality of coded IFF interrogation signals toward a target during each
    cycle of system operation, for receiving coded IFP
    reply signals from a transponding target, and for developing an output signal in response to each received coded reply signal;
  and indicator means, responsive to said output signals
    and including a passive visual indicator device, for
    producing a change in the operating state of said
    visual device in response to said output signals,
    thereby to provide a visual indication of the receipt
    of reply signals from said transponding target, identifying said target as either friendly or hostile, and
    of the approximate range of said target from the
    system.

14. A lightweight IFF interrogator-indicator system in
accordance with claim 13 wherein said transmitting and
receiving means develops a first output signal in response
to each received correctly coded IFF reply signal, wherein there is additionally included range gate generating
means, coupled to said control signal generating means,
for generating a plurality of range gate signals during
each cycle of system operation, each range gate signal
representing a predetermined range interval from said
system, and wherein said indicator means detects coincidence between said first output signals and said range
gate signals and produces a change in the operating state
of said passive visual indicator device in response to each
such detected coincidence, thereby to provide a visual
indication of the receipt of correctly coded IFF reply
signals from said transponding target, identifying said
target as a friendly target, and of the approximate range
of said target from the system.

15. A lightweight IFF interrogator-indicator system
capable of portable use by a person to derive an indication of the range and azimuth of a target comprising:
  control signal generating means for generating at least
    a first control signal having a characteristic determinative of the duration of one cycle of system operation;
  transmitting and receiving means, coupled to said control signal generating means and including a compact light-weight antenna having a directional characteristic and capable of being manually trained toward a target to be interrogated, thereby to provide
    an indication of the approximate azimuth of said
    target, for generating and transmitting a plurality
    of coded interrogation signals toward a target during each cycle of system operation, for receiving
    coded reply signals from a transponding target and
    for developing a first output signal in response to
    each received correctly coded reply signal and for
    developing a second output signal in response to each
    received incorrectly coded reply signal;
  and indicator means responsive to said output signals
    and including first and second passive visual indicator devices, for producing a change in the operating state of said first visual indicating device in response to said first output signals, thereby to provide a visual indication of the receipt of correctly
    coded reply signals from a transponding target, identifying said target, and of the approximate range of
    said target from the system, and for producing a
    change in the operating state of said second visual
    indicator device in response to said second output
    signal, thereby to provide a visual indication of the
    receipt of incorrectly coded reply signals from a
    transponding target, identifying said target, and of
    the approximate range of said target from the system.

16. A lightweight IFF interrogator-indicator system in
accordance with claim 15, wherein said first and second
passive visual indicator devices each consists of a set of
indicator lamps, each lamp in a set being representative of
a given range interval from said system, and wherein an
indicator lamp in said first set is activated in response to
said first output signals, thereby to provide a visual indication of the receipt of correctly coded reply signals
from a transponding target, identifying said target, and
of the approximate range of said target from the system,
and wherein an indicator lamp in said second set is activated in response to said second output signals, thereby
to provide a visual indication of the receipt of incorrectly
coded reply signal from a transponding target, identifying said target, and of the approximate range of said target from the system.

17. A lightweight IFF interrogator-indicator system
capable of portable use by a person to derive an indication of the range and azimuth of a target, comprising:
  control signal generating means for generating at least
    a first control signal having a characteristic determinative of the duration of one cycle of system operation;
  transmitting and receiving means, coupled to said control signal generating means and including a compact lightweight antenna having a directional characteristic and capable of being manually trained toward a target to be interrogated thereby to provide
    an indication of the approximate azimuth of said
    target, for generating and transmitting a plurality of
    coded interrogation signals toward a target during
    each cycle of system operation, for receiving coded
    reply signals from a transponding target, and for
    developing a first output signal in response to each
    received correctly coded reply signal, and a second
    output signal in response to each received incorrectly
    coded reply signal;
  range gate generating means, coupled to said control
    signal generating means, for generating a plurality of
    range gate signals during each cycle of system operation, each range gate signal representing a predetermined range interval from said system;
  and indicator means, responsive to said output signals
    and to said range gate signals and including first and
    second passive visual indicator devices, for detecting
    coincidence between said first output signals and
    said range gate signals and for producing a change in
    the operating state of said first visual device in response to each such detected coincidence, thereby to
    provide a visual indication of the receipt of correctly coded reply signals from said transponding target, identifying said target, and of the approximate range of said target from the system, and for detecting coincidence between said second output signals and said range gate signals and for producing a change in the operating state of said second visual device in response to each such detected coincidence, thereby to provide a visual indication of the receipt of incorrectly coded reply signals from a transponding target, identifying said target, and of the approximate range of said target from the system.

References Cited

UNITED STATES PATENTS

| | | | |
|---|---|---|---|
| 2,691,162 | 10/1954 | Geer | 343—6.5 |
| 3,035,262 | 5/1962 | Vantine | 343—6.5 |
| 3,087,151 | 4/1963 | Vantine | 343—6.5 |
| 3,179,933 | 4/1965 | Hahnel | 343—6.5 X |
| 3,257,659 | 6/1966 | Siegel | 343—6.5 X |

RODNEY D. BENNETT, *Primary Examiner*

M. F. HUBLER, *Assistant Examiner.*